Sept. 8, 1953   E. J. COURTNEY   2,651,582
METHOD OF MAKING A CUPRAMMONIUM CELLULOSE SOLUTION
Filed Dec. 22, 1952   7 Sheets-Sheet 1

INVENTOR
Edward J. Courtney

ATTORNEYS

Sept. 8, 1953                E. J. COURTNEY                2,651,582

METHOD OF MAKING A CUPRAMMONIUM CELLULOSE SOLUTION

Filed Dec. 22, 1952                                             7 Sheets—Sheet 2

INVENTOR
Edward J. Courtney
BY
ATTORNEYS

Sept. 8, 1953     E. J. COURTNEY     2,651,582
METHOD OF MAKING A CUPRAMMONIUM CELLULOSE SOLUTION
Filed Dec. 22, 1952     7 Sheets-Sheet 3

INVENTOR
Edward J. Courtney

BY
ATTORNEYS

Sept. 8, 1953　　　E. J. COURTNEY　　　2,651,582
METHOD OF MAKING A CUPRAMMONIUM CELLULOSE SOLUTION
Filed Dec. 22, 1952　　　　　　　　　　　7 Sheets-Sheet 4

INVENTOR
Edward J. Courtney

BY
ATTORNEYS

Sept. 8, 1953  E. J. COURTNEY  2,651,582
METHOD OF MAKING A CUPRAMMONIUM CELLULOSE SOLUTION
Filed Dec. 22, 1952  7 Sheets-Sheet 5

INVENTOR.
Edward J. Courtney

Sept. 8, 1953          E. J. COURTNEY          2,651,582
METHOD OF MAKING A CUPRAMMONIUM CELLULOSE SOLUTION
Filed Dec. 22, 1952          7 Sheets-Sheet 6

Inventor
Edward J. Courtney
By
Attorney

Sept. 8, 1953 E. J. COURTNEY 2,651,582
METHOD OF MAKING A CUPRAMMONIUM CELLULOSE SOLUTION
Filed Dec. 22, 1952

Inventor
Edward J. Courtney

Patented Sept. 8, 1953

2,651,582

UNITED STATES PATENT OFFICE 2,651,582

METHOD OF MAKING A CUPRAMMONIUM CELLULOSE SOLUTION

Edward J. Courtney, Oaklyn, N. J., assignor to Cellulose Fibers Incorporated, Toledo, Ohio, a corporation of Ohio Application December 22, 1952, Serial No. 327,207

10 Claims. (Cl. 106—167)

This application is a continuation-in-part of my copending application Serial No. 301,660 which was filed July 30, 1952, as a continuation of my earlier filed application Serial No. 255,666, filed November 9, 1951, and now abandoned. This application is founded upon the concept set forth in the two mentioned earlier applications and is being filed for the purpose of setting forth modified forms of apparatus upon which the process of the invention may be performed.

The invention relates to a substantially fiber-free cuprammonium cellulose solution which is capable of being spun into rayon filaments of varying deniers, of being spread and calendered for the production of transparent sheet material essentially consisting of regenerated cellulose and popularly known as cellophane, and to a process for the production of masses of regenerated cellulose essentially free of impurities and capable of being transformed by subsequent treatment into other cellulose products such as cellulose sponges and the like.

The art of producing cuprammonium cellulose solutions has been developed in the past to an extent such that the materials and the general proportions of each used in producing such solutions are quite well-known. It has been learned, for example, that perhaps the simplest ingredients are caustic soda, copper sulfate and aqueous ammonia; the art, however, proceeding on the basis for the most part that the most effective results are achieved when the cellulose pulp is pre-causticized, as by steeping with an excessive quantity of caustic, and the excess removed by squeezing prior to the addition of copper and ammonia. In fact, in most commercial operations the presteeping step is invariably employed.

Additionally, most prior art experimenters, as well as the commercial producers of cuprammonium cellulose solutions, have prepared them under controlled temperature conditions, usually with all of the equipment involved being jacketed and cooled by brine or other coolant or, in the case of laboratory work, by the addition of ice to the solutions, to temperatures in the order of, say, 4° C. The difficulty and expense involved in cooling these solutions, both to control the exothermic heat of reaction and the volatilization of the ammonia, is expensive and requires considerable care.

The cuprammonium division of the rayon fabricating art has lagged behind the development of the viscose division of the art. Even though considerable attention has been devoted to cuprammonium cellulose solutions and their production, those processes which have become commercially usable are slow and involve mixing techniques extending over substantial periods of time. Most of these processes are based upon the belief that it is neccessary to pre-steep the pulp, and to slowly mix the cellulose and other solution ingredients at low temperature in order to achieve an actual dissolved cellulose which can be regenerated into a commercially usable form.

Even under these long controlled processes the art apparently has been unable to so completely dissolve the cellulose as to eliminate the necessity for laborious filtering operations in order to achieve substantially fiber-free solutions which can be spun or otherwise further processed for the production of rayon, cellophane, sponges and the like.

Not only do these prior art processes involve long tedious and involved steps including the steeping and filtering operations, but because of the necessity for performing these complex operations the equipment needed for commercial production is extremely expensive.

It is, therefore, the principal object of this invention to provide a process for the production of cuprammonium cellulose solutions in a short time without the necessity for artificial cooling and so nearly fiber-free as to permit their commercial use in the production of rayon filaments and other materials without the necessity for extensive filtration.

It is another object of this invention to produce a cuprammonium cellulose solution which is substantially fiber-free immediately, i. e., in which substantially all of the cellulose fibers are dissolved so that the solution can be further processed without filtering, i. e., without the necessity for any difficult process to remove undissolved fibers from the solution. It may, however, be advantageous under some operating conditions to run the solution through a coarse screen, for example, a mass of steel wool, to prevent the inclusion of foreign matter in the finished solution, this being a more or less conventional technique in handling solutions.

It is another object of this invention to provide a process for the preparation of cuprammonium cellulose solutions in which the order of addition of the solution ingredients is not critical and thus to simplify the process by enabling these solutions to be prepared at will and admixed with the cellulose simultaneously, if desired, so as to subject the cellulose and the solution ingredients to a violent agitation for a very short period of time compared to prior art processes, whereby the tendency of the solution ingredients to "spoil" or to vaporize is rendered unimportant.

A yet further object of this invention which stems from the preceding object is to provide a process for the preparation of cuprammonium cellulose solutions suitable for use in subsequent spinning or other regenerating processes which can be performed upon simple, inexpensive equipment, where the precise nature of the equipment is not in the least critical, and thus where a commercial installation for the practice of the process can be set up and operated at a far lesser capital expenditure than is the case with prior art processes.

These objectives are achieved by violently beating or agitating the cellulose with such power that admixtures containing certain proportionate parts of several ingredients for each part of cellulose are forced into solution and "go up" (i. e., pass through the characteristically sudden increase in viscosity) within probably not more than 15 or 20 minutes and, in practice, within a period of time as short as from 20 seconds to 3 minutes from the time of commencing the agitation.

As mentioned, the processes of the art are generally characterized by the presence of one or more of the cooling, steeping and lengthy mixing steps. By reason of my discovery I am able to eliminate all three of these previously deemed important operations in the production of cuprammonium cellulose solutions.

In the prior art wood pulp or cotton linters or other relatively fine cellulose material, for example, containing, say, 95% of alpha cellulose, is first mixed with a caustic soda solution by stirring or steeping the cellulose in the solution for a substantial length of time, say, 30 minutes to several hours, in order to impregnate the cellulose with the caustic. This stirring action breaks up the cellulose mass into shreds and lumps generally of rice kernel size and shape. The impregnation of the pulp by the caustic solution under these conditions is less than complete and, therefore, many prior processes expose the cellulose to an excessive amount of caustic and after even longer steeping times press the cellulose to remove the excess caustic. The pressing operation, of course, aids in impregnating the pulp with the caustic but does not produce a uniformly impregnated pulp any more than the initial stirring uniformly impregnates the pulp.

In contrast to this preliminary step of steeping or initial impregnation of the pulp with the caustic soda solution, my process contemplates that the caustic will be added to the pulp simultaneously with or either before or after the other solution ingredients and that the peculiarly violent agitation to which the pulp is subjected will disperse the solution or solutions through the pulp fibers to a degree so great as to result in substantially complete dissolution of the fibers.

Similarly, the admixture of the water-soluble copper salt, for example copper sulfate, and the ammonia with the pulp has for the most part been performed by slow stirring and by the addition of the pulp to a bath composed of the proper proportions of several ingredients, including water. By adding the pulp to the solution and by stirring it in this manner the pulp is gradually forced into solution in the ingredients and in order to achieve a degree of solution so that the admixture is even capable of filtering to produce a usable material, a lengthy and expensive stirring operation is required.

On the other hand, in my improved process, I beat or violently agitate the pulp to such an extent that the mass of pulp is broken up to a degree far in excess of that possible to achieve where the pulp is added to a solution and stirred therein. The heating as performed in my process is characterized by the fact that the pulp is broken to such an extent that there are no shreds or lumps of pulp and the fibers are rendered open and free from each other. In general, the pulp is so violently agitated that when the solution ingredients are added they do not form a separate liquid phase but are immediately dispersed upon and absorbed by the fibers, such thorough dispersal and absorption being so rapidly achieved that the mass enters into solution and "goes up" in a period of time in the order of from three minutes to, say, not more than 15 minutes. In practicing my process I have found that not only is it necessary to violently agitate the solution ingredients in order to effectuate the uniform and thorough dispersal and absorption of the solutions by the fibers, but it is also necessary that the entire body or mass of the admixture of solution ingredients shall be violently recirculated as it were through the immediate area or zone in which violent agitation is to take place. By thus violently agitating a zone of the admixture during the dispersal and absorption and by rapidly and repeatedly beating the balance of the admixture into and out of such zone, a uniformly thorough and substantially simultaneous solution takes place throughout the entire mass.

Preferably, the ingredients of the solution, i. e., the copper solution, caustic solution and ammonia solution are added gradually to the pulp while the pulp is violently agitated in a manner to be further explained. As the ingredients are added, whether simultaneously or in whatever order may be desired, the fluffy expanding mass of cellulose does not change its general physical characteristics, i. e., it remains as an open, loose mass of wetted fibers with all of the fibers gradually receiving a sufficient amount of solution and with no appreciable excess of solution being present in any portion of the loose violently agitated mass.

As this thorough dispersion of the solution constituents and their admixture takes place, it can be observed by watching the color of the pulp uniformly and gradually change to the color, for example, of the copper solution. The entire mass of pulp reaches the proper proportions with respect to the solvent ingredients almost simultaneously throughout the mass and the fibers pass into solution. This occurrence results in a very rapid and uniform change in viscosity throughout the mass and is readily apparent to an operator because of the tremendously great load suddenly acting against the agitating mechanism. This phenomenon has been denominated as "going up" and in the process of my invention it occurs with startling rapidity.

As is well-known in the regenerated cellulose art, whether its subsequent treatment is based upon a viscose solution or upon a cuprammonium solution, optimum characteristics of produced materials are achieved with certain viscosities of the solutions from which they are produced. The control of the final viscosities of the cuprammonium solutions produced according to my invention is very simple because water can be added to the admixture as a carrier for each of the solution ingredients and the quantity of water finally present in the solution is thus controllable with nicety.

In order to more completely explain and clearly set out the degree of violent agitation necessary to achieve the novel rapid production of a cuprammonium cellulose solution according to the invention there are shown in the drawings attached hereto several mechanisms for carrying out the agitation steps and a number of modified agitators employed in such mechanisms all of which have been designed and operated according to the invention for the production of cuprammonium cellulose solutions embodying the invention and being so nearly fiber free as to be usable without subsequent detailed filtering operations. All of these said mechanisms and agitators have been operated in accordance with the examples set forth below.

As explained above, a process embodying the invention involves operating upon the cellulose and the cuprammonium solution ingredients with a degree of violent agitation sufficient to cause solution of the cellulose in the solution ingredients to a substantially complete degree, the degree being measured by the fact that the final solution is so nearly fiber-free as to be usable without filtering and that such solution is achieved within a period of from three to about 15 minutes from the time the process is commenced.

In the several apparatuses and their modifications as illustrated in the drawings details of construction are shown, and in the following description specific sizes and speeds are given, in order to clearly point out a number of different apparatuses upon which the process of the invention can be carried out.

Figure 1:
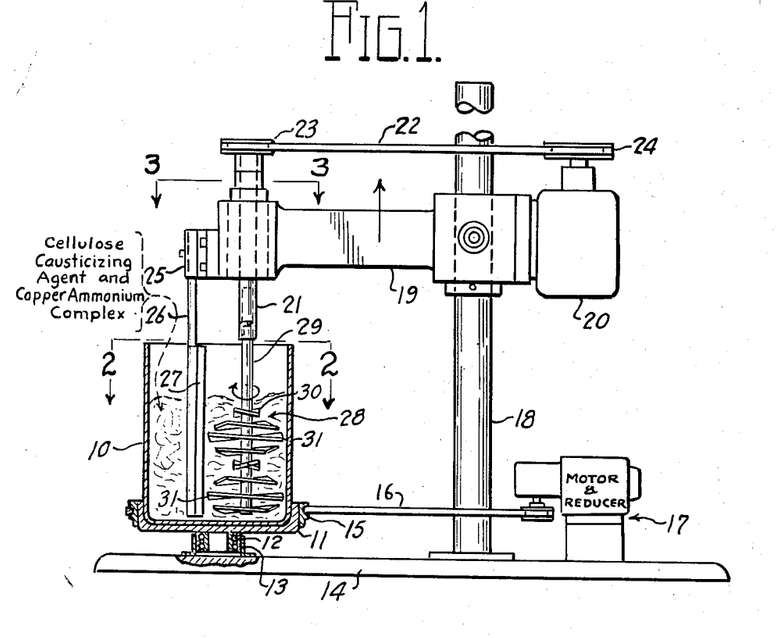
Fig. 1 is a view in elevation, with parts shown in section, of a pilot plant apparatus for carrying out the process of the invention.
Figure 2:
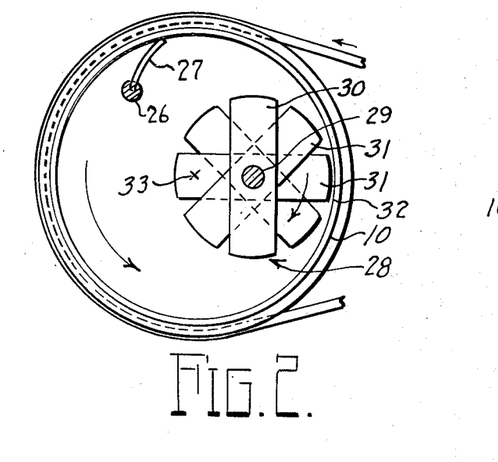
Fig. 2 is an enlarged horizontal view taken on the line 2—2 of Fig. 1.
Figure 3:
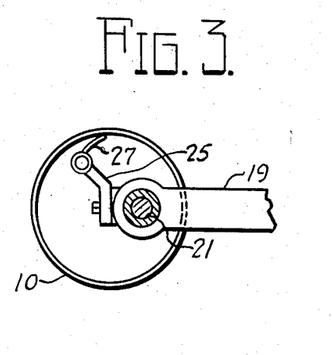
Fig. 3 is a fragmentary detailed sectional view taken on the line 3—3 of Fig. 1.

For example, in the apparatus of Figs. 1, 2 and 3 a mixing container or can 10, measuring approximately 6" inside diameter by 7¼" depth, is mounted in a turntable 11 which is journalled by a short vertical shaft 12 in a bearing 13 mounted upon a base 14. The table 11 carries a peripheral pulley 15 which is engaged by a driving belt 16 driven in turn from a motor and speed reducer unit generally indicated at 17.

A post 18 supports an arm 19 which, in turn, carries a beater motor 20 and a beater spindle 21. The spindle 21 is driven by the motor 20 through the medium of a belt 22 engaged in a spindle pulley 23 and motor pulley 24 respectively. In the apparatus illustrated in Figs. 1–3 the respective sizes of the pulleys 23 and 24 are such that the speed of the beater spindle 21 is 2000 R. P. M. or an increase over the standard speed of 1750 R. P. M. of the motor 20. Also mounted on the end of the arm 19 which rotatably supports the beater spindle 21 is an arm 25 which supports a scraper 26. The scraper 26 extends downwardly into the can 10 and has a flexible scraper blade 27 that scrapes the inner surface of the can 10. As can be seen in Fig. 1, the scraper blade 27 extends to the bottom of the can 10, there being merely an operating clearance between the bottom edge of the scraper blade 27 and the bottom of the can 10.

The spindle 21 removably mounts a beater 28 having a shaft 29 and a plurality of propeller-like blades consisting of an upper blade 30, and in this instance, seven lower blades 31. It will be observed that the upper blade 30 is pitched in such direction as to force solution in the can 10 downwardly while the lower blades 31 are all pitched to force the solution upwardly. In the apparatus illustrated in Figs. 1–3 having a can of the dimensions given and rotating at the speeds given, each of the beater blades 30 or 31 is 3½" long and 1¼" in width. The axis of the beater shaft 29 is located at such point that the ends of the beater blades 30 and 31 have only a small operating clearance from the interior of the can 10. This situation is best seen in Fig. 2 where the clearance is indicated by the reference number 32 and where it can be seen that the blades 30 and 31 extend beyond the axis of rotation of the can 10, indicated by the reference number 33. Also in Fig. 2 it will be observed that the can 10 rotates in a counterclockwise direction and the beater 28 rotates in a clockwise direction. The scraper blade 27 is so located with respect to the beater 28 that it is just beyond the beater 28 with respect to the direction of rotation of the can 10. In the apparatus illustrated in Figs. 1–3 the beater blades 30 and 31 occupy a vertical space of 4", the blades being relatively thin but also being located closely adjacent each other vertically. The blades 30 and 31 are staggered on the shaft 29 with each blade being rotated approximately 45° with respect to the adjacent blades.

As will be seen by reference to Examples 2, 3 and 4 below, apparatus of the type illustrated in Figs. 1 to 3, having the dimensions set forth above and operating at the speeds and in the directions explained, is effective in the practice of the process embodying the invention on a pilot plant scale.

In changing the design of the apparatus of the pilot plant type as shown in Figs. 1–3 to such size as is appropriate for commercial production, some variation in the precise relationships between the speeds of the beater and container are permissible and constructional details may be varied as necessary to produce a sturdy and powerful machine. The apparatus illustrated in Figs. 4–6, inclusive, is, therefore, again merely illustrative of apparatus of commercial plant size and capacity, carrying out the fundamentals of design and operation required to practice the process of the invention.

Figure 4:
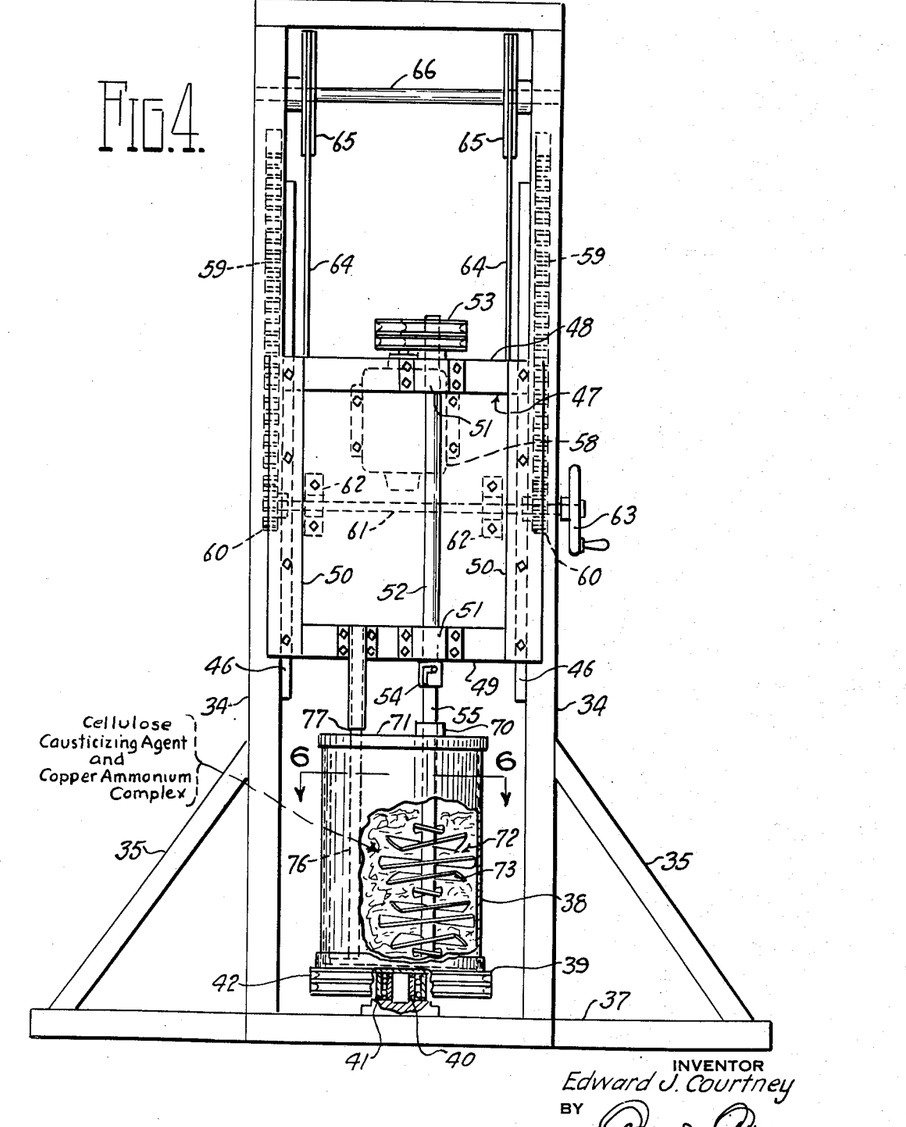
Fig. 4 is a view in front elevation, with parts broken away, of one form of a commercial apparatus for the production of a cuprammonium cellulose solution according to the invention.
Figures 5, 6:
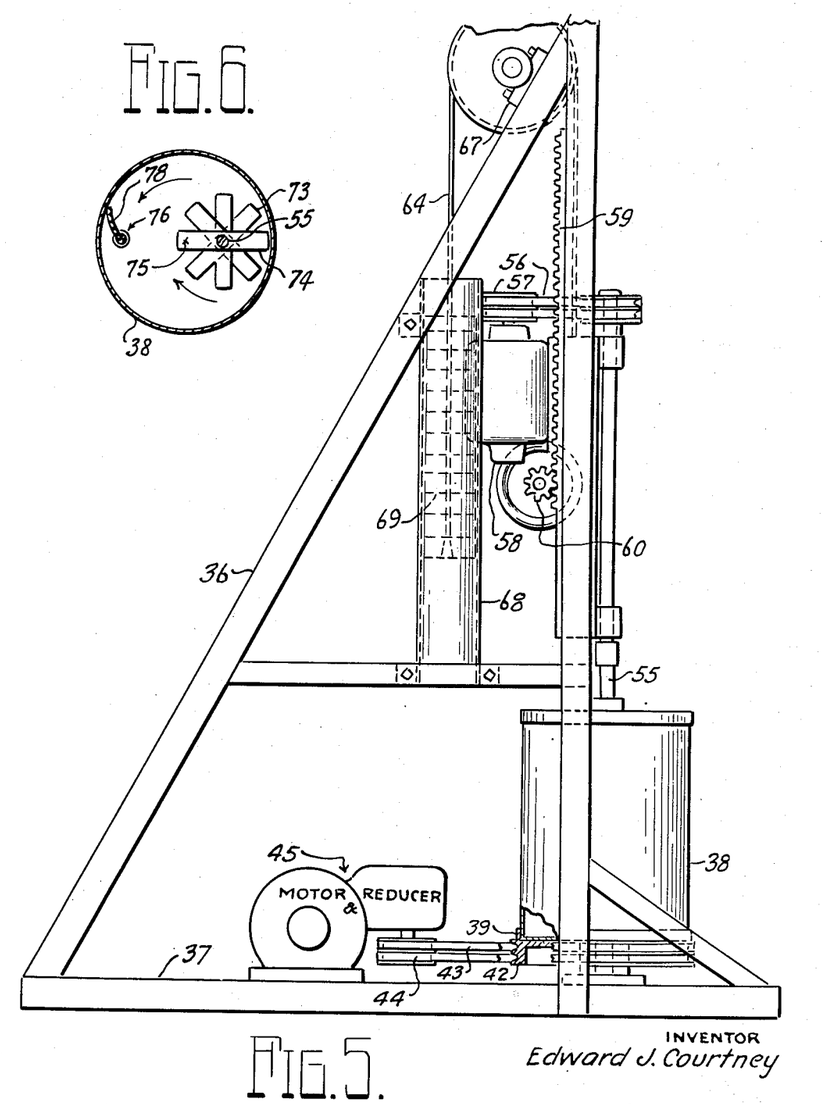
Fig. 5 is a side view in elevation of the commercial apparatus shown in Fig. 4.
Fig. 6 is a horizontal sectional view taken substantially on the line 6—6 of Fig. 4.

In the commercial apparatus of Figs. 4–6, inclusive, a main frame comprises spaced parallel uprights 34, side braces 35 and rear braces 36 (Fig. 5) which are welded or otherwise firmly secured to each other and to a base structure 37. A mixing can 38, in this case having an inside diameter of 12¾" and a depth of 16¾", is supported upon a turntable 39 which is, in turn, supported by a stub shaft 40 that is mounted in a bearing 41 fixed on the base 37. The turntable 39 has a double sheave pulley 42 around its perimeter and a pair of driving belts 43 are engaged in the pulley 42 and in a double pulley 44 driven by a motor and speed reducer generally indicated at 45. In the commercial apparatus constructed in accordance with Figs. 4–6, the dimensions of the pulleys 42 and 44 and the construction of the motor and speed reducer 45 are such as to rotate the can 38 at 30 R. P. M. in a counterclockwise direction, as is best seen in Fig. 6.

Each of the uprights 34 has a vertically extending way 46 which, acting together, slidably mount a vertically movable frame 47. The frame 47 has spaced horizontal cross members 48 and 49 and vertical frame members 50 which engage the ways 46. A pair of bearing blocks 51 mounted on the cross arms 48 and 49 rotatably support a spindle 52 on the upper end of which is mounted a double belt pulley 53 and the lower end of which is provided with a socket 54 for a beater shaft 55. The pulley 53 is engaged by a pair of driving belts 56 which also are engaged in a motor pulley 57 mounted on the shaft of a driving motor 58 which may be bolted or otherwise secured to the sliding frame 47.

Two racks 59 are secured on the rear of the uprights 34 and engaged by two pinions 60 which are pinned on a horizontally extending shaft 61 journalled in bearings 62 bolted or otherwise secured to the sliding frame 47. A hand wheel 63 is secured on one end of the shaft 61. Rotation of the hand wheel 63 rotates the pinions 60 which run up the racks 59 to raise the sliding frame 47 and the mechanism supported thereby. Suitable retaining or "dogging" means may be provided for locking the pinions 60 in the racks 59 when desired. Cables 64 are secured to the sliding frame 47 and led up and over idler pulleys 65 mounted upon a shaft 66 journalled in bearing blocks 67 (Fig. 5) supported by the back braces 36. The cables 64 extend downwardly into counterbalancing weight guide tubes 68 and a plurality of weights 69 are secured on each of the cables 64 to counterbalance the weight of the sliding frame 47 and the mechanism carried thereby.

The beater shaft 55 extends downwardly through a collar 70 (Fig. 4) in a lid 71 of the can 38 into the interior of the can 38. A beater 72 which consists, in this instance, of nine cutter blades 73, extends vertically through a distance of 10½", each of the blades 73 being 8" long and approximately 1½" wide, all of the blades 73 being pitched to force solution downwardly. The lowermost one of the blades 73 is located only a sufficient distance above the bottom of the can 38 to provide for operating clearance. The axis of the shaft 55 (Fig. 6) as is the case with the cutter group shown in the mechanism of Figs. 1–3, is shown positioned relative to the axis of rotation of the can 38 that it rotates the blades 73 with only an operating clearance indicated at 74 in Fig. 6 from the side of the can 38. Again, the blades 73 extend into the can 38 beyond its axis of rotation which is indicated by the reference number 75 in Fig. 6.

A scraper 76 is supported by a bar 77 from the lower cross arm 49 and has a semi-flexible blade 78 which scrapes the interior of the can 38, being located "beyond" the beater 72 with respect to the direction of rotation of the can 38. In the apparatus illustrated in Figs. 4–6 the beater is rotated at 1750 R. P. M.

As will be more clearly explained in Examples 1 and 4 below, commercial operation in accordance with the process embodying the invention for the production of substantially fiber-free cuprammonium cellulose solution according to the invention is made possible through the use of beating equipment in general following the above description, having the dimensions and operating at the speeds and in the directions as set forth. It will be apparent that various changes and modifications can be made from the procedure described which are to be construed as illustrating, but not as limiting the invention.

*Example 1*

A substantially fiber-free cuprammonium cellulose solution was produced in the apparatus shown in Figs. 4 through 6 of the drawings from cellulose, a causticizing agent therefor, a copper ammonium complex, and water according to the following procedure:

Alpha-cellulose pulp, in the form of a sheet one-sixteenth inch thick, was cut into three inch squares. A 1 pound 7 ounce charge of these alpha-cellulose squares was placed in the mixing can 38 of the commercial apparatus shown in Figs. 4–6 of the drawings, and revolution of the beater 72 in the direction of the arrow in Fig. 6 at about 1750 R. P. M. was started to effect shredding and fluffing and continued throughout the following operations to produce violent agitation. The mixing can 38 was rotated in the direction of the arrow in Fig. 6 at about 30 R. P. M. during this and subsequent steps in the operation. After shredding and fluffing had proceeded for about 2 minutes a 376 gram portion of sodium hydroxide dissolved in three liters of water was added to the mixer. About 1 minute after the NaOH addition a solution containing 2 pounds 8¼ ounces of $CuSO_4 \cdot 5H_2O$, 5 liters of 26° Baumé ammonium hydroxide and 3.3 liters of water was added to the mixing can. Ammonium hydroxide of 26° Baumé contains about 29 per cent of $NH_3$. The terms "per cent" and "parts" are used herein, and in the appended claims, to mean per cent and parts by weight, unless otherwise indicated. About 1½ minutes after this addition agitation was discontinued. A sample of the resulting cuprammonium cellulose solution was removed from the mixer on a glass stirring rod and placed between microscope slides. Upon examination of the slide by the naked eye, under a microscope, or when polarizing filters were held on either side of the microscope slides[1] no cellulose fibers were observed. The total elapsed time from starting of violent agitation to fiber-free solution was about 4½ minutes.

Example 2

A series of experiments demonstrating the use of comminuted alpha-cellulose wood pulp as a preferred source for cellulose, and the independence of the invention from the order of addition of ingredients, was carried out in the apparatus shown in Figs. 1 through 3 of the drawings in accordance with the following procedures:

(a) A 30 gram portion of alpha-cellulose pulp previously comminuted in a "Model D" Fitzpatrick comminuting machine using a #4 screen which has approximately ¼" diameter holes, about 9 per square inch, was charged into the can 10 of the apparatus shown in Figs. 1-3 of the attached drawings, and revolution of the beater 28 in the direction of the arrow in Fig. 1 at about 2000 revolutions per minute was started to effect shredding and fluffing and continued throughout the following operations to produce the required violent mixing agitation. The can 10 was rotated in the direction of the arrow in Fig. 2 at about 24 R. P. M. during this and subsequent steps of the operation. A solution of 65 grams of $CuSO_4 \cdot 5H_2O$, dissolved in 187 cc. of water was then added to the can, followed immediately by a solution of 20 grams of sodium hydroxide dissolved in 187 cc. of water, which, in turn, was followed immediately by 250 cc. of 26° Baumé ammonium hydroxide. Approximately two minutes after the ammonium hydroxide addition revolution of the beater 28 and rotation of the can 10 were discontinued, and a sample of resulting cuprammonium cellulose solution was removed from the can on a glass stirring rod and placed between microscope slides. Upon examination of the slide by the naked eye, under a microscope, or when polarizing filters were held on either side of the microscope slides, no cellulose fibers were observed. The total elapsed time from starting of violent agitation to fiber-free solution was about 3 minutes.

(b) A 30 gram portion of alpha-cellulose pulp comminuted as described in the preceding paragraph was placed in the can 10 and revolution of the beater 28 and rotation of the can 10 as there described were begun. A 350 cc. addition of 26° Baumé ammonium hydroxide was then made, followed immediately by a solution containing 20 grams of sodium hydroxide dissolved in 187 cc. of water, which, in turn, was followed immediately by a solution of 65 grams of $CuSO_4 \cdot 5H_2O$ dissolved in 187 cc. of water. Approximately 2 minutes after the addition of the $CuSO_4 \cdot 5H_2O$ solution, revolution of the beater blades and rotation of the can were discontinued, and a sample of the resulting cuprammonium cellulose solution was removed from the can on a glass stirring rod and placed between microscope slides. Under examination as hereinbefore described, no cellulose fibers were observed. The total elapsed time from starting of violent agitation to fiber-free solution was about 3 minutes.

(c) A procedure identical with that described in the two preceding paragraphs was carried out except that the sodium hydroxide solution was added to the pulp first, followed immediately by the ammonium hydroxide, which, in turn, was followed immediately by the copper sulfate. Identical results were achieved.

(d) A procedure identical with those previously described, in the present example, was carried out except that the sodium hydroxide solution was mixed with a previously combined solution of the $CuSO_4 \cdot 5H_2O$ in water and the ammonium hydroxide immediately prior to addition of the resulting mixture to the cellulose in the can, and except that revolution of the beater 28 and rotation of the can 10 were discontinued about 20 seconds after addition of the above mixture to the cellulose. Substantially identical results were achieved. It has been found that best results are obtained when a single addition is made to the pulp, as described in this paragraph, when the cuprammonium solution is freshly prepared, and when the causticizing agent is added thereto just prior to admixture with the pulp.

(e) A solution containing 40 grams of sodium hydroxide dissolved in 450 cc. of water was mixed with a previously combined fresh solution of 130 grams of $CuSO_4 \cdot 5H_2O$ dissolved in 450 cc. of water with 350 cc. of 26° Baumé ammonium hydroxide, and the resulting mixture was added immediately to the can 10. A 70 gram portion of alpha-cellulose pulp comminuted as described above was then added to the can 10, and revolution of the beater 28 and rotation of the can as described were started. After about 2 minutes of violent agitation of the comminuted pulp with the combined mixture of sodium hydroxide, $CuSO_4 \cdot 5H_2O$, ammonia, and water, revolution of the beater 28 and rotation of the can 10 were discontinued. Results substantially identical with those described above were achieved.

(f) Procedures similar to those previously described in this example were also carried out, but adding the ingredients in all other possible orders and combinations. By all such procedures substantially fiber-free solutions were achieved except when the NaOH was mixed with the $CuSO_4 \cdot 5H_2O$ an appreciable time before introduction into the can 10. In these instances there was opportunity for precipitation of $Cu(OH)_2$, which is known to the art to be disadvantageous; therefore, when the sodium hydroxide and copper salt are to be premixed before addition to the can, optimum results may be expected when the time interval between premixing and introduction is kept very short. In every instance the ---
[1] It has been observed experimentally that cellulose fibers, when viewed in this way, appear as well defined light spots, apparently because they transmit the polarized light while the surrounding solution does not.

Example 3

(a) A quantity of alpha-cellulose squares as described in Example 1, weighing 75.5 grams was immersed in 374 cc. of a sodium hydroxide solution containing 212 grams per liter of NaOH. After a 3 hour soak in this solution 221 cc. thereof was squeezed from the squares, which were then placed in the can 10 of the apparatus shown in Figs. 1–3 of the drawings. Revolution of the beater 28 and rotation of the can 10 as hereinbefore described were then started and continued. The caustic solution squeezed from the pulp squares contained 188 grams per liter of NaOH. After violent agitation of the causticized pulp for approximately 2 minutes, a 375 cc. addition of water was made; about one minute after the water was added a 130 gram portion of $CuSO_4.5H_2O$ dissolved in 375 cc. of water was added to the fluffed pulp. Approximately 1 minute after the copper sulfate addition a 350 cc. charge of 26° Baumé ammonium hydroxide was added thereto. About 3 minutes after the ammonium hydroxide addition agitation was discontinued, and a sample of the resulting cuprammonium cellulose solution was removed from the can on a glass stirring rod and placed between microscope slides. Upon examination of the slides by the naked eye, under a microscope, or when polarizing filters were held on either side of the microscope slides, no cellulose fibers were observed. The total elapsed time from starting of violent agitation to fiber-free solution was about 7 minutes.

(b) A procedure substantially identical with that described in the preceding paragraph, was carried out, except that a 187 cc. portion of $H_2O$ was added to the can after the initial two minute shredding and fluffing of the causticized pulp, followed immediately by 65 grams of powdered $CuSO_4.5H_2O$, the charge of ammonia being added one minute after the copper sulfate. Identical results were achieved. The total elapsed time from starting of violent agitation to fibre-free solution was about 5 minutes.

Example 4

A preferred way of making a cuprammonium cellulose solution from cellulose, a causticizing agent therefor, a copper ammonium complex, and water is demonstrated by the following procedures:

(a) A 70 gram portion of alpha-cellulose pulp comminuted as described in Example 2 was placed in the can 10 of the apparatus shown in Figs. 1–3 of the drawings, and revolution of the beater and rotation of the can as there described were started and continued. A solution containing 40 grams of sodium hydroxide dissolved in 450 cc. of water was added to the comminuted pulp in the mixer. About 1 minute after the sodium hydroxide addition a fresh solution made by mixing 130 grams of $CuSO_4.5H_2O$ dissolved in 450 cc. of water with 350 cc. of 26° Baumé ammonium hydroxide was added to the causticized pulp in the can. About 2 minutes after the addition of the cuprammonium solution violent agitation was discontinued, and rotation of the can was stopped. A sample of the resulting cuprammonium cellulose solution was removed on a glass stirring rod and placed between microscope slides. Upon examination of the slides by the naked eye, under a microscope, or when polarizing filters were held on either side of the microscope slides, no cellulose fibers were observed. The total elapsed time from starting of violent agitation to fiber-free solution was about 3 minutes.

(b) A 700 gram portion of alpha-cellulose pulp comminuted as described in Example 2 was placed in the mixing can 38 of the commercial apparatus shown in Figs. 4–6 of the drawings, and revolution of the beater 72 in the direction of the arrow in Fig. 6 at about 1750 R. P. M. was started, and continued throughout the following operations. The mixing can was rotated in the direction of the arrow in Fig. 6 at about 30 R. P. M. during this and subsequent steps in the operation. A solution containing 400 grams of sodium hydroxide dissolved in 4.5 liters of water was added to the comminuted pulp in the mixer. About 1 minute after the sodium hydroxide addition a fresh cuprammonium solution made by mixing 1.3 kilograms of $CuSO_4.5H_2O$ dissolved in 4.5 liters of water with 3.5 liters of 26° Baumé ammonium hydroxide was added to the causticized pulp in the can. About 2 minutes after the addition of the cuprammonium solution agitation was discontinued, and rotation of the can was stopped. A sample of the resulting cuprammonium cellulose solution was removed and examined, between microscope slides, by the naked eye, under a microscope, and through polarizing filters, as described. No cellulose fibers were visible. The total elapsed time from starting of violent agitation to fiber-free solution was about 3 minutes.

As clearly appears from the above descriptions of the two apparatuses set forth in Figs. 1–3, inclusive, and in Figs. 4–6, inclusive, the degree of violent agitation comprised within the scope of the instant invention is intense. Although at the time of filing of the above-mentioned earlier applications experimentation had proceeded from the pilot plant apparatus shown in Figs. 1–3 to the commercial apparatus shown in Figs. 4–6, inclusive, and although the essence of the invention in the violent agitation and recirculation of the mass of solution ingredients was appreciated, experimentation with modified forms of agitating means in modified forms of apparatus had not been conducted. Therefore, the invention has been practiced in modified forms of apparatus and of agitators, and with variations in the operation of these apparatuses in order to point out further modifications of apparatus which may be employed in the practice of the process embodying the invention for the production of cuprammonium cellulose solutions embodying the invention.

Figure 7:
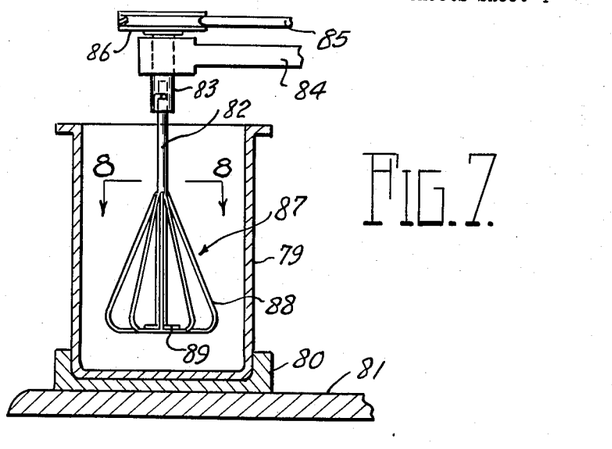
Fig. 7 is a vertical, sectional view somewhat similar to Fig. 1 and of apparatus of approximately the same physical size and showing an entirely different form of agitator which can be employed in a modified manner for the carrying out of the process embodying the invention.
Figures 8, 9:
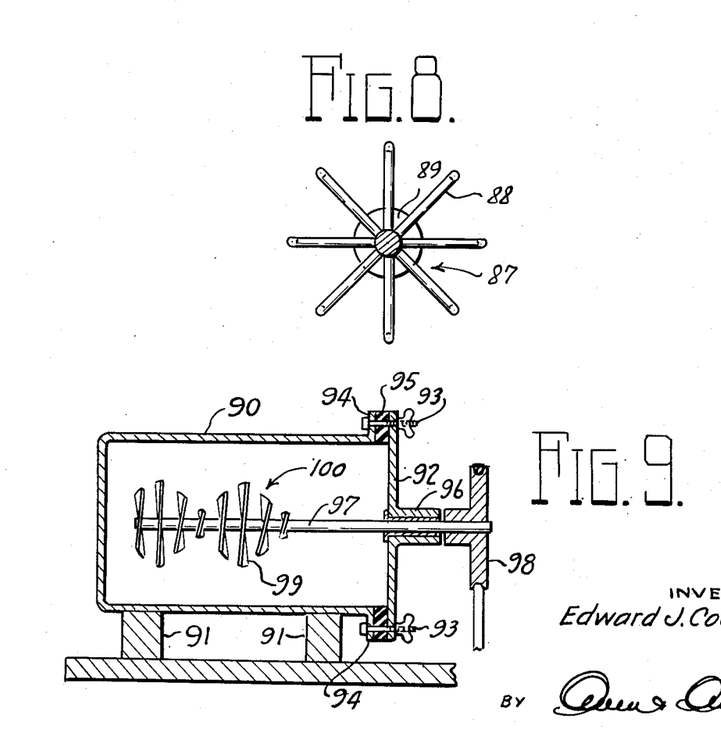
Fig. 8 is a detailed horizontal sectional view taken substantially on the line 8—8 of Fig. 7 and further illustrating the form of the agitator shown in Fig. 7.
Fig. 9 is a vertical sectional view on the center line of a modified form of apparatus similar to that shown in Fig. 1 but in which the agitator and its drive shaft extend horizontally into the mass of solution ingredients rather than vertically into the mass as is the case in the structures shown in Figs. 1 to 8 inclusive.

A simple modification of apparatus for the carrying out of the invention is illustrated in Figs. 7 and 8 of the drawings. In Fig. 7 there is shown a simple apparatus consisting of an open topped can 79. In this instance the can 79 is stationarily mounted in a support 80 which may be placed upon a table 81 or other surface.

A rotary shaft 82 extends downwardly at the center of the can 79, being removably mounted in an arbor 83 which is rotatably journalled in a frame arm 84 for driving by a belt 85 that is engaged in a pulley 86.

The removable shaft 82 mounts an agitator generally indicated at 87 which comprises a plurality of formed wires 88. Each of the wires 88 is welded, brazed, or otherwise secured to the shaft 82 at its upper end and inclined downwardly and away from the shaft 82 being bent over horizontally and turned inwardly with all of the bottom ends of the wires 88 secured to a small bracing disk 89 which is mounted in the lower end of the shaft 82. The wires 88 define a generally cone shaped structure.

The can 79 of the apparatus illustrated in Figs. 7 and 8 was approximately six inches in diameter and approximately 9 to 10 inches deep. The agitator 87 employed comprises 8 of the formed wires 88 and measured 4 inches from the point of the meeting of the wires on the shaft 82 at the upper ends of the wires 88 to the disk 89 in the shaft. The wires 88 and the shaft 82 were set at an angle such that the diameter of the base of the cone-like surface defined by the wires 88 was approximately 4 inches. The disk 89 at the lower end of the shaft 82 was positioned approximately 2 inches above the bottom of the can 79.

Operation of the apparatus shown in Figs. 7 and 8 in accordance with the instant invention for the production of a substantially fiber free cuprammonium cellulose solution in accordance with the invention was achieved, details of this operation being set forth in Example 8 below.

It is to be observed that in the operation of the apparatus shown in Figs. 7 and 8 in accordance with Example 8 set forth below, the can 79 was not rotated and the shaft 82 was centered upon the central axis of the can 79. The high speed rotation of the beater or agitator 87 was sufficient to create a zone of violent agitation and to repeatedly and rapidly move the balance of the mass of solution ingredients into and out of such zone of agitation to achieve the results set forth in Example 8 below.

Further investigation of the nature of the violent agitation constituting a portion of the instant invention was demonstrated by the operation of apparatus as shown in Fig. 9. The apparatus of Fig. 9 consisted in a can 90 which was mounted upon pedestal supports 91 to which the can was fixedly attached to prevent its movement. The can 90 was provided with a removable lid 92 which was fixed to the can 90 by a plurality of bolts 93 extending through the edges of the lid 92 and through a turned over lip 94 on the can 90. An annular sealing gasket 95 was placed between the edge of the lid 92 and the lip 94 to prevent leakage.

The lid 92 was provided with a centrally located packing gland 96 through which there extended horizontally a shaft 97. The shaft 97 was provided with a pulley 98 at its outer end.

The shaft 97 was an agitator shaft similar to the shaft 29 of the apparatus shown in Fig. 1 and provided, also similarly to the agitator shown in Fig. 1, with a plurality of propeller-like agitating blades 99. The dimensions of the can 90 and of the agitator blades 99 and their general relationships were substantially identical with the dimensions and relationships set forth with respect to the apparatus shown in Figs. 1 to 3, inclusive, except that, as noted above, the can 90 was stationarily mounted and the shaft 97 extended along the central horizontal axis of the can 90. The agitator blades 99 mounted upon the agitator shaft 97 provided a means for creating the violent agitation generally referred to as an agitator 100 in Fig. 9 and in Example 7 set forth below.

As was the case in the operation of each of the apparatuses already described in carrying out the process of the invention, as set forth in the several examples relating thereto, the procedure as described in Example 7 below produced a substantially fiber-free cuprammonium cellulose solution, and the change in shaft direction from vertical (as shown in the apparatuses of Figs. 1–8, inclusive) to horizontal made no discernible difference in the quality of the solution produced, the time involved, or the method of the invention itself.

In further analysis of the method embodying the instant invention, it was observed that all of the containers or cans in which the solution ingredients were placed in the apparatuses illustrated in Figs. 1 through 9, inclusive, were generally cylindrical in shape and had generally flat bottoms. Furthermore, in all of these apparatuses the various agitators disclosed extended throughout a substantial axial length of the agitator shafts. In order to depart substantially from the mechanical limitation of the operations of the apparatuses so far described, the apparatus of Figs. 10–14, inclusive, was employed.

Figure 10:
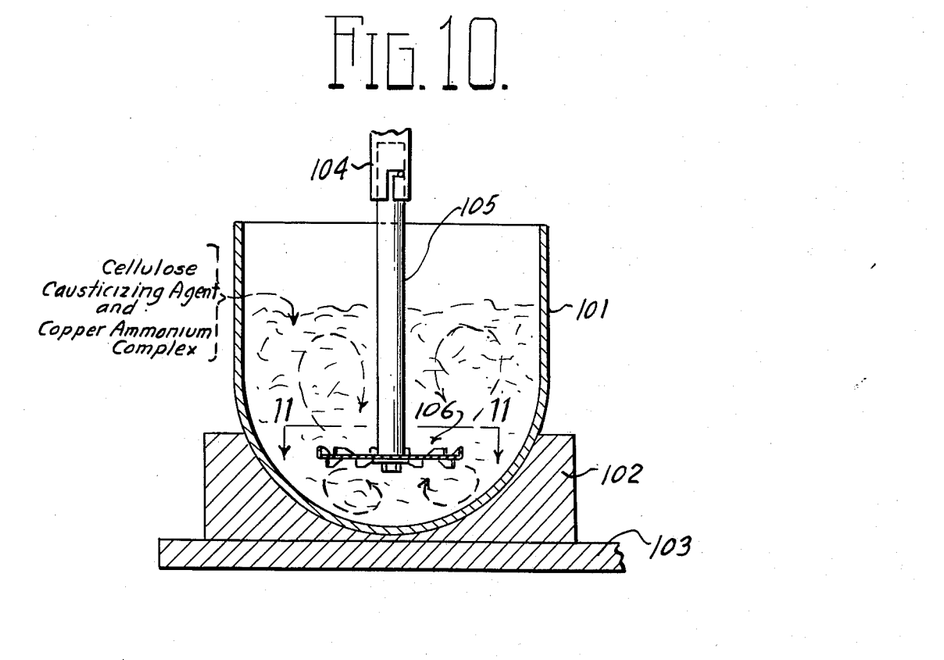
Fig. 10 is a vertical sectional view illustrating an entirely different form of agitator employed with a different form of can and constituting apparatus upon which the process of the instant invention can be carried out.

In the apparatus of Fig. 10, a container or can 101 was employed having an inside horizontal diameter of approximately 12½ inches and with a spherical bottom on a radius of 6¼ inches. The can 101 was stationarily mounted in a bowl shaped support 102 which was in turn mounted on a table or shelf 103.

In this apparatus an arbor 104 similar to the arbor 21 shown in Fig. 1 was positioned with its axis coincidental to the vertical axis of the can shown in Fig. 1. An agitator shaft 105 was inserted in the arbor 104. The shaft 105 extended down into the can 101 along its central axis to a point approximately 2 inches above the center bottom of the can 101. An agitator 106 was mounted on the lower end of the shaft 105.

The agitator 106 (shown in detail in Figs. 11 and 12) consisted of a disk 107 approximately 6 inches in diameter. The disk 107 had a serrated periphery formed by a plurality of veins 108 and 109. Each of the veins 108 and 109 was bent either upwardly or downwardly as the case may be and lay in a vertical plane parallel to the axis of the shaft 105. The veins 108 and 109 were alternated around the periphery of the disk 107, there being 16 blades in total, of which 8 were bent upwardly (veins 108) and 8 were bent downwardly (veins 109). The shaft 105 was rotated in such a direction as to rotate the agitator 106 as indicated by the arrow in Fig. 11.

Upon rotation of the agitator shaft 105 described in Example 5 set forth below, a pattern of agitation was established as illustrated by the broken line arrows in Fig. 10, thus establishing a central, generally horizontal zone of violent agitation and rapidly and repeatedly removing the mass of solution ingredients into and out of such zone. The operation of this apparatus in carrying out the method of the invention, and employing the quantities of solution ingredients for the times as set forth in Example 5 below, again produced a substantially fiber-free cuprammonium cellulose solution in accordance with the invention.

Figure 11:
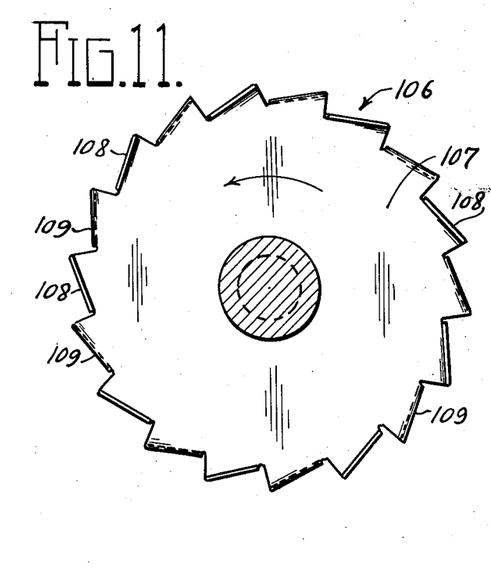
Fig. 11 is a horizontal sectional view taken substantially on the line 11—11 of Fig. 10 and showing the agitating means of Fig. 10 on an enlarged scale and in detail.
Figure 12:
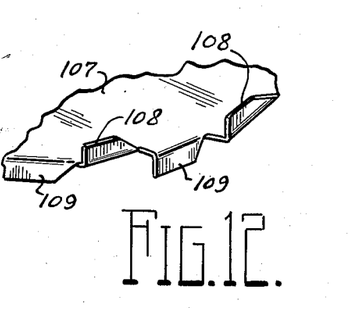
Fig. 12 is a fragmentary view in perspective showing a small portion of the edge of the agitator means of Fig. 11.
Figures 13, 14, 15:
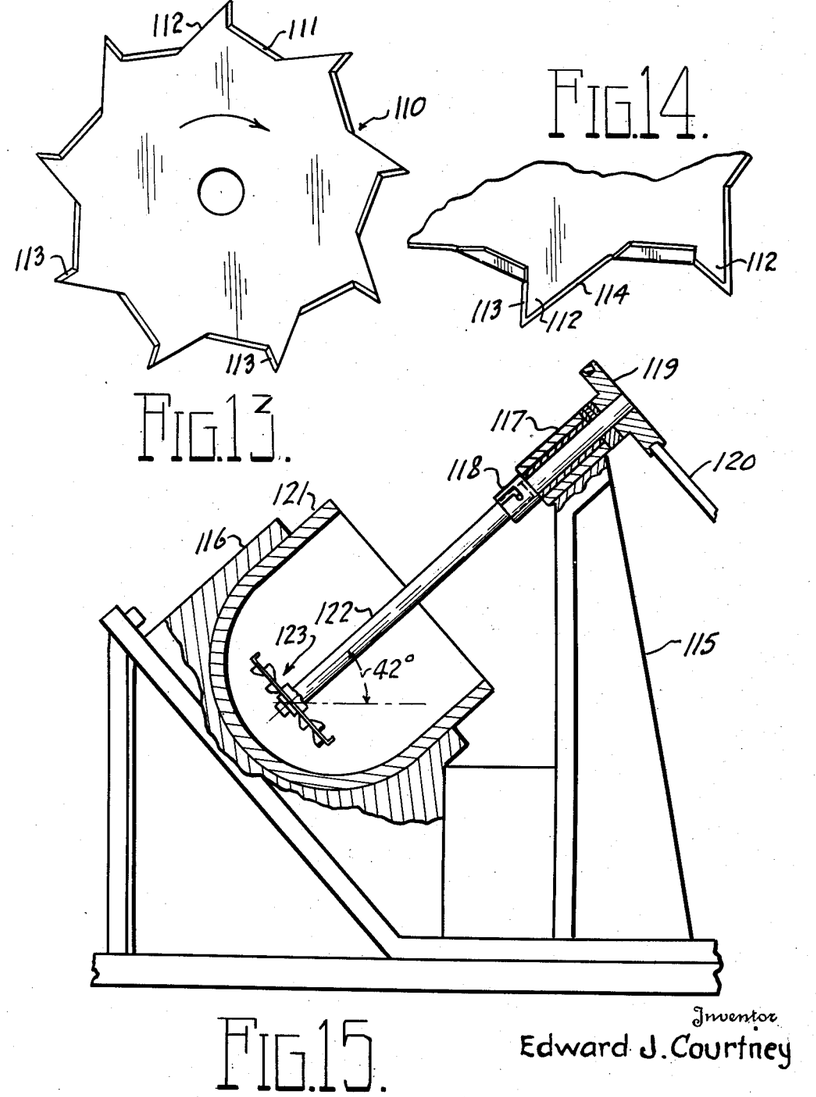
Fig. 13 is a plan view similar to Fig. 11 but of a modified form of agitator of the same general type as that shown in Fig. 11.
Fig. 14 is a fragmentary perspective view of the agitator as shown in Fig. 13 and on a slightly enlarged scale.
Fig. 15 is a vertical sectional view generally similar to Figs. 1 and 10 but showing an agitator of the type disclosed in Figs. 11-14, inclusive, and mounted upon a shaft extending angularly into the mass of solution ingredients.

In further analysis of the operation of apparatus in carrying out the method of the invention, the agitator blade 106 as illustrated in Figs. 11 and 12 was replaced by a similar though modified agitator blade 110 as illustrated in Figs. 13 and 14. The approximate diameter of the blade 110 again was 6 inches. In this instance, however, the blade was formed with 9 upwardly directed, outwardly extending veins 111 spaced from each other by planar spear-point projections 112. As can best be seen in Fig. 14, each of the radially directed edges 113 of the projections 112 was beveled to form a knife edge while the angularly extending return edges 114 of the projections 112 were flat.

Upon rotation, of the agitator blade 110 as set forth in Example 5 below, and in the direction indicated by the arrow in Fig. 13, a mass of solution ingredients comprising cellulose, a causticizing agent therefor, and a copper ammonium complex was converted to a substantially fiber-free cuprammonium cellulose solution.

As was the case in the change of agitator means between the forms shown in Figs. 1–3, inclusive, and that shown in Figs. 7 and 8, where both of the shafts employed were vertical, and similarly, as in the change between the apparatuses of Figs. 1–8, inclusive, and that of Fig. 9, the change of agitator form from that shown in Figs. 10–12, inclusive, to that shown in Figs. 13–14, inclusive, made no perceptible difference in the quality of the solution produced by the method of the apparatus. It will be observed in the study of the examples pertaining to these various forms of apparatuses which have been employed in carrying out the invention that successful solution may be produced in varying manners of precise operation at varying speeds of rotation of the agitators and with the agitators in varying positions and extending in varying directions into the masses of solution ingredients being agitated.

The apparatus shown in Fig. 15 provides a further illustration of the relative unimportance of the precise form of apparatus employed for carrying out the invention and of the immateriality of the direction of extension into the mass of solution ingredients of the agitator shaft.

In Fig. 15 there is illustrated an agitating apparatus comprising a pedestal 115 which extended upright alongside a can mounting socket 116 and was provided with an inclined bearing 117 at its upper end. An arbor 118 was journalled in the bearing 117 and provided with a pulley 119 in which a driving belt 120 was engaged. A can 121 similar in detail to the can 101 shown in Fig. 10, was mounted in the mounting socket 116. An agitator shaft 122 substantially identical with the shaft 105 of Fig. 10 and provided with a generally disk shaped agitator 123 was mounted in the arbor 118. The agitator 123 was identical in all details with the agitator 106 illustrated in detail in Figs. 11 and 12.

Upon the carrying out of the process of the invention in the apparatus shown in Fig. 15, as set forth in Example 6, below, again a satisfactory, substantially fiber-free cuprammonium cellulose solution was produced in accordance with the instant invention.

While the agitators employed in the apparatuses disclosed in Figs. 1–9, inclusive, extended axially throughout a substantial length of their shafts, and thus the zones of agitation created extended along the axis of the agitator shaft throughout a considerable volume of the solution ingredients being agitated, it has been explained that in the apparatuses disclosed in Figs. 10–15, inclusive, the agitator members themselves were located in a relatively lesser area of the solution ingredients. However, as is apparent in Fig. 10 where the broken arrows indicate the agitation pattern created, the zone of violent agitation and the area of movement of the solution ingredients extended throughout a substantial portion of the admixture. Carrying on the concept disclosed by the use of the agitators of Figs. 10–15, inclusive, apparatus as shown in Figs. 16 and 17 was employed in carrying out the method of the invention.

Figure 16:
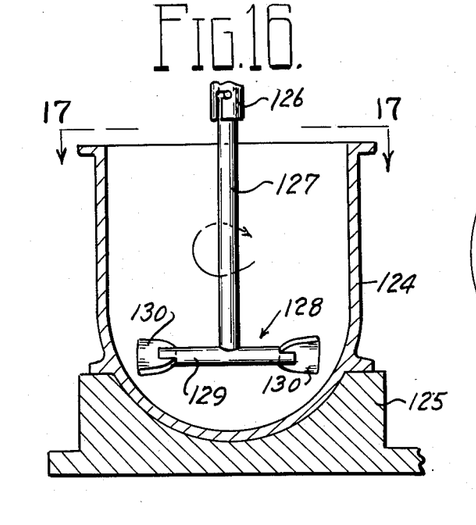
Fig. 16 is a vertical sectional view generally similar to Figs. 1 and 10 but showing a radically different form of agitator extending downwardly into a mass of solution ingredients.

The apparatus of Fig. 16 consisted in a container 124 substantially identical with the can 101 of the apparatus of Fig. 10, and mounted in a similar manner in a base 125. In this apparatus an arbor 126 was located above the can 124 and extended coaxially therewith. An agitator shaft 127 was removably mounted in the arbor 126 and constituted an integral element with an agitator 128.

Figure 17:
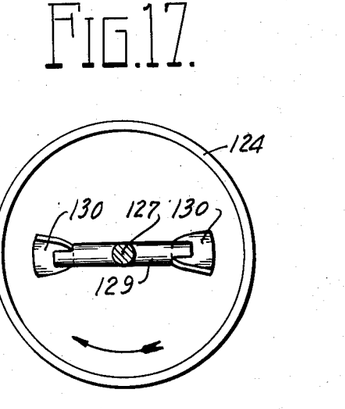
Fig. 17 is a horizontal sectional view taken substantially on the position indicated by the line 17—17 of Fig. 16.

The agitator 128 of the apparatus illustrated in Figs. 16 and 17 constituted a reduction to fundamental elements of an agitator means. The agitator 128 consisted only of a short rod 129 welded or brazed at the lower end of the shaft 127 and extending horizontally with respect thereto. Each end of the rod 129 was notched to receive a small paddle blade 130. The paddle blades 130 were oppositely inclined in the manner of a propeller to cause not only agitation by reason of the centrifugal throwing away of the solution ingredients but also to create vertical movement of the solution ingredients during admixture and in order to force them into and out of the zone immediately adjacent the agitator 128.

Upon operation of the apparatus shown in Figs. 16 and 17 by rotation of the shaft 127 to produce rotation of the agitator 128 in the direction of the arrows in Figs. 16 and 17, and as set forth in detail in Example 11 below, again a substantially fiber-free cuprammonium cellulose solution was produced through the method of the invention.

Figure 18:
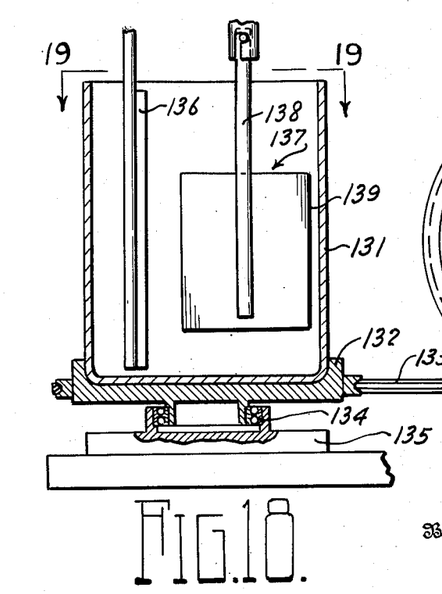
Fig. 18 is a view similar to a portion of Fig. 1 or to Figs. 7, 10 and 16 and showing generally the apparatus of Fig. 1 as equipped with a radically modified agitator means, again constituting apparatus on which the process of the instant invention can be carried out.
Figure 19:
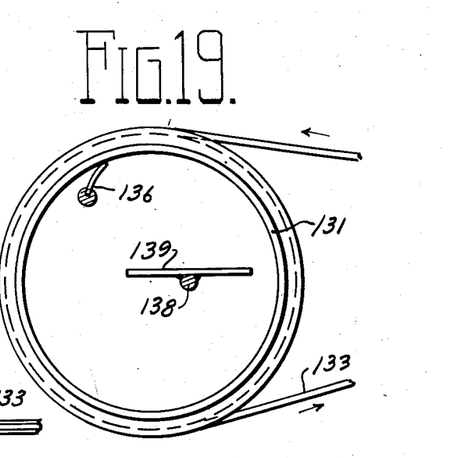
Fig. 19 is a horizontal sectional view taken substantially on the line 19—19 of Fig. 18.

In further development of the concept of violent agitation embodying the invention, i. e., that a zone of violent agitation needs be created within the mass of solution ingredients, and that the balance of the solution ingredients must be moved into and out of such zone with rapidity and violent action, the apparatus of Figs. 18 and 19 was employed to extend the area of the zone of violent agitation substantially throughout the vertical extent of the body of the solution ingredients. In the apparatus of Figs. 18 and 19 a can 131 was mounted and rotated in a manner identical with the mounting and rotation of the container can 10 of the apparatus shown in Fig. 1. The can 131 was placed upon a turntable 132 rotatably driven by a belt 133 and journalled in a bearing 134 which was supported upon a base 135.

As was the case with the apparatus shown in Figs. 1–3, inclusive, a scraper blade 136 extended downwardly into the can 131 adjacent its wall to assist in maintaining a pattern of movement of the solution ingredients into and out of the zone of agitation created by the agitator.

In the apparatus of Figs. 18 and 19 an agitator 137 was employed. The agitator 137 consisted merely of a shaft 138 provided with a rectangular, generally planar paddle 139 brazed, welded, or otherwise attached thereto.

The cam 131 had a diameter of approximately 6 inches and was approximately 7½ inches deep. The paddle 139 was approximately 3½ inches wide and 4 inches high. The axis of the shaft 138 was vertical and located approximately 2 inches from the inner wall of the can 131. The lower edge of the paddle 139 extended downwardly to within approximately 2 inches of the bottom of the can 131.

As was the case with each of the apparatuses disclosed in the preceding described drawings and in their operation in accordance with the correlated examples, when the apparatus of Figs. 18 and 19 was employed for the practice of the instant invention, as set forth in detail in Example 12 below, a satisfactory fiber-free cuprammonium solution suitable for use in the manufacture of filaments or sheets was produced.

Example 5

A substantially fiber-free cuprammonium cellulose solution was produced in the apparatus shown in Figs. 10 through 14 of the drawings from starting materials including cellulose, a causticizing agent therefor, and a copper ammonium complex according to the following procedures:

(a) A 650 gram portion of cellulose impregnated with a solution of 400 grams of sodium hydroxide dissolved in 4500 cc. of H₂O and comminuted in the apparatus shown in Figs. 4–6 of the drawings with the beater shaft 55 rotating in the direction of the arrow in Fig. 6 at about 1600 revolutions per minute was added to the can 101 (Fig. 10). A freshly prepared cuprammonium solution produced by mixing a 3500 cc. portion of 26° Baumé ammonium hydroxide with a solution of 1300 grams of $CuSO_4.5H_2O$ in 2250 cc. of water was then poured over the impregnated cellulose in the can 101. The resulting mixture was then agitated violently for about 5 minutes by rotation of the shaft 105 (Fig. 10) at about 3475 revolutions per minute. A sample of the resulting cuprammonium cellulose solution was removed from the mixer on a glass stirring rod and placed between microscope slides. Upon examination of the sample by the naked eye, under a microscope, or when polarizing filters were held on either side of the microscope slides no cellulose fibers were observed. The total elapsed time from starting of violent agitation to fiber-free solution was about 5 minutes.

(b) The procedure described in paragraph (a) of this example was repeated, except that the shaft 105 (Fig. 10) was positioned laterally of the center of the can 101 instead of being centered therein as shown in Fig. 10. The results achieved were identical with those reported above.

(c) The procedures described in paragraphs (a) and (b) of this example were repeated, except that the cuprammonium solution was added to the can 101, followed by the impregnated wood pulp. The results achieved were identical with those reported above in paragraph (a).

(d) A 650 gram portion of cellulose impregnated with a solution of 400 grams of sodium hydroxide dissolved in 4500 cc. of water and manually mashed with a wooden paddle was added to the can 101 (Fig. 10). A freshly prepared cuprammonium solution produced by mixing a 3500 cc. portion of 26° Baumé ammonium hydroxide with a solution of 1300 grams of $CuSO_4.5H_2O$ in 2250 cc. of water was then poured over the impregnated cellulose in the can 101. The resulting mixture was then agitated violently for about 5 minutes by rotation of the shaft 105 (Fig. 10) at about 3475 R. P. M. A sample of the resulting cuprammonium cellulose solution was removed from the mixer on a glass stirring rod and placed between microscope slides. Upon examination of the sample by the naked eye, under a microscope, or when polarizing filters were held on either side of the microscope slides no cellulose fibers were observed. The total elapsed time from starting of violent agitation to fiber-free solution was about 5 minutes.

(e) The procedure described in paragraph (d) of this example was also repeated using the blade 110 shown in Figs. 13 and 14 of the drawings. The results achieved were identical with those reported above.

(f) The procedure described in paragraph (d) of this example was repeated except that the shaft 105 (Fig. 10) was rotated at 1800 revolutions per minute. The cuprammonium cellulose solution produced was found to contain a few lumps of undissolved cellulose, but no fibers.

(g) The blade 106 shown in Figs. 11 and 12 was replaced by the blade 110 shown in Figs. 13 and 14, and the cuprammonium cellulose solution containing a few lumps of undissolved cellulose produced according to paragraph (f) was agitated by the blade 110 rotating at 1800 R. P. M. for an additional 5 minutes. Examination of the cuprammonium cellulose solution after this further agitation revealed no lumps of undissolved cellulose, and no cellulose fibers.

(h) The procedure described in paragraph (d) of this example was repeated except that the blade 106 shown in Figs. 11 and 12 was replaced by a similar blade having a diameter of 8 inches, and the shaft 105 (Fig. 10) was rotated at about 1800 R. P. M. The results achieved were identical with those quoted in paragraph (a).

(i) The procedure described in paragraph (d) of the present example was repeated except that the agitator 106 was replaced by a similar agitator having a diameter of 8 inches. The results achieved were identical with those reported in paragraph (a).

Example 6

A substantially fiber-free cuprammonium cellulose solution was produced in the apparatus shown in Fig. 15 of the drawings from starting materials including cellulose, a causticizing agent therefor, and a copper ammonium complex according to the following procedure:

A freshly prepared cuprammonium solution produced by mixing a 3500 cc. portion of 26° Baumé ammonium hydroxide with a solution of 1300 grams of $CuSO_4.5H_2O$ in 2250 cc. of water was added to the can 121. A 650 gram portion of cellulose impregnated with a solution of 400 grams of sodium hydroxide dissolved in 4500 cc. of H₂O and manually mashed with a wooden paddle was then added to the cuprammonium cellulose solution in the can 121. The resulting mixture was then agitated violently for about 5 minutes by rotation of the shaft 122 at about 3475 R. P. M. A sample of the resulting cuprammonium cellulose solution was removed from the mixer on a glass stirring rod and placed between microscope slides. Upon examination of the sample by the naked eye, under a microscope, or when polarizing filters were held on either side of the microscope slides no cellulose fibers were observed. The total elapsed time from the starting of violent agitation to fiber-free solution was about 5 minutes.

Example 7

A substantially fiber-free cuprammonium cellulose solution was produced in the apparatus shown in Fig. 9 of the drawings from starting materials including cellulose, a causticizing agent therefor, and a copper ammonium complex according to the following procedure:

A 60 gram portion of alpha-cellulose squares was placed in the can 90. The agitator 100 was revolved for about 1 minute at approximately 1200 R. P. M. A solution of 40 grams of sodium hydroxide dissolved in 450 cc. of water was then added to the can 90 followed, approximately 1 minute later, by a solution of 130 grams of $CuSO_4.5H_2O$ dissolved in 450 cc. of water and 350 cc. of 26° Baumé ammonium hydroxide. Approximately 4 minutes after the copper sulfate-ammonium hydroxide addition, revolution of the agitator 109 was discontinued and a sample of the resulting cuprammonium cellulose solution was removed from the can and placed between microscope slides. Upon examination of the solution sample by the naked eye, or when polarizing filters were held on either side of the microscope slides, no cellulose fibers were observed.

*Example 8*

A substantially fiber-free cuprammonium cellulose solution was produced in the apparatus shown in Figs. 7 and 8 of the drawings from starting materials including cellulose, a causticizing agent therefor, and a copper ammonium complex according to the following procedure:

A 65 gram portion of cellulose impregnated with a solution of 40 grams of sodium hydroxide dissolved in 450 cc. of $H_2O$ and manually mashed with a wooden paddle was added to the can 79 (Fig. 7). A freshly prepared cuprammonium solution produced by mixing a 350 cc. portion of 26° Baumé ammonium hydroxide with a solution of 130 grams of $CuSO_4.5H_2O$ in 225 cc. of water was then poured over the impregnated cellulose in the can 79. The resulting mixture was then agitated violently for about 5 minutes by rotation of the shaft 82 in the direction of the arrow (Fig. 7) at about 2000 R. P. M. A sample of the resulting cuprammonium cellulose solution was removed from the mixer on a glass stirring rod and placed between microscope slides. Upon examination of the example by the naked eye, under a microscope, or when polarizing filters were held on either side of the microscope slides no cellulose fibers were observed. The solution did contain a few lumps of undissolved cellulose, which could easily be removed therefrom by simple filtration, for example, by passing the solution through steel wool. Extensive filtration such as is required to remove small cellulose fibers would not be required. The total elapsed time from starting of violent agitation to fiber-free solution was about 5 minutes.

*Example 9*

A substantially fiber-free cuprammonium cellulose solution was produced in a modified version of the apparatus shown in Figs. 1 through 3 of the drawings from starting materials including cellulose, a causticizing agent therefor, and a copper ammonium complex according to the following procedure:

(a) The scraper blade 27 was removed from the can 10, and the arm 19 was translated, and with it the shaft 29, until the latter was positioned centrally in the can 10. A 60 gram portion of alpha-cellulose squares was then placed in the can, and revolution of the beater 28 in the direction of the arrow in Fig. 1 at about 2000 R. P. M. was started. The can was not rotated during this procedure. A solution of 40 grams of sodium hydroxide dissolved in 450 cc. of water was then added to the can 10 followed, approximately 1 minute later, by a solution of 130 grams of $CuSO_4.5H_2O$ dissolved in 450 cc. of water and 350 cc. of 26° Baumé ammonium hydroxide. Approximately 4 minutes after the copper sulfate-ammonium hydroxide addition, revolution of the beater 28 was discontinued and a sample of the resulting cuprammonium cellulose solution was removed from the can and placed between microscope slides. Upon examination of the solution sample by the naked eye, under a microscope, or when polarizing filters were held on either side of the microscope slides, no cellulose fibers were observed.

(b) A procedure identical with that described in paragraph (a) of this example except that the 130 grams of $CuSO_4.5H_2O$ was dissolved in 225 cc. of water and 350 cc. of 26° Baumé ammonium hydroxide, and the can 10 was replaced by a round bottom can having about a 6 inch inside diameter was also carried out with results identical with those reported above. The radius of curvature of the round bottom of the can used was approximately the radius of the cylindrical portion of the can.

*Example 10*

A substantially fiber-free cuprammonium cellulose solution was produced in the apparatus shown in Figs. 1–3 of the drawings from starting materials including cellulose, a causticizing agent therefor, and a copper ammonium complex according to the following procedure:

(a) A 65 gram portion of cotton linters impregnated with a solution of 40 grams of sodium hydroxide dissolved in 450 cc. of $H_2O$ was added to the can 10, and revolution of the beater 28 at about 2000 R. P. M. and rotation of the can 10 at about 28 R. P. M. were started and continued. A fresh solution of 130 grams of $$CuSO_4.5H_2O$$

dissolved in 450 cc. of water and 350 cc. of 26° Baumé ammonium hydroxide was then added to the causticized pulp in the can. About 5 minutes after the addition of the cuprammonium solution violent agitation was discontinued, and rotation of the can was stopped. A sample of the resulting cuprammonium cellulose solution was removed on a glass stirring rod and placed between microscope slides. Upon examination of the sample between the slides by the naked eye, under a microscope, or when polarizing filters were held on either side of the microscope slides, no cellulose fibers were observed. However, copper oxide precipitated from this solution within about a week after it was prepared, so that it would have to be spun promptly or stabilized, e. g., with about 1 per cent of sugar or glucose based upon the weight of cotton linters dissolved.

(b) A procedure identical with that described in paragraph (a) of this example was also carried out, except that the 65 gram portion of cotton linters was replaced by a 32½ gram portion of cotton linters and a 32½ gram portion of wood pulp squares, the combination of cotton linters and wood pulp squares being impregnated with 40 grams of sodium hydroxide dissolved in 450 cc. of water. The results achieved were identical with those reported in paragraph (a), except that copper oxide did not precipitate from the cuprammonium cellulose solution.

*Example 11*

A substantially fiber-free cuprammonium cellulose solution was produced in the apparatus shown in Figs. 16 and 17 of the drawings from starting materials including cellulose, a causticizing agent therefor, and a copper ammonium complex according to the following procedure:

A 65 gram portion of cellulose impregnated with a solution of 40 grams of sodium hydroxide dissolved in 450 cc. of water and manually mashed with a wooden paddle was added to the round bottom can 124. A freshly prepared cuprammonium solution produced by mixing a 350 cc.

portion of 26° Baumé ammonium hydroxide with a solution of 130 grams of CuSO₄·5H₂O in 225 cc. of water was then poured over the impregnated cellulose in the can, and the resulting mixture was agitated violently for about 5 minutes by rotation of the shaft 127 at about 2000 R. P. M. A sample of the resulting cuprammonium cellulose solution was removed from the mixer on a glass stirring rod and placed between microscope slides. Upon examination of the sample by the naked eye, under a microscope, or when polarizing filters were held on either side of the microscope slides no cellulose fibers were observed. The total elapsed time from starting of violent agitation to fiber-free solution was about 5 minutes.

*Example 12*

A substantially fiber-free cuprammonium cellulose solution was produced in the apparatus shown in Figs. 18 and 19 of the drawings from starting materials including cellulose, a causticizing agent therefor, and a copper ammonium complex according to the following procedure:

A 60 gram portion of cellulose impregnated with a solution of 40 grams of sodium hydroxide dissolved in 450 cc. of water and manually mashed with a wooden paddle was added to the can 131. A freshly prepared cuprammonium solution produced by mixing a 350 cc. portion of 26° Baumé ammonium hydroxide with a solution of 130 grams of CuSO₄·5H₂O in 225 cc. of water was then poured over the impregnated cellulose in the can 131. The resulting mixture was then agitated violently for about 5 minutes by rotation of the shaft 138 (Fig. 18) at about 2000 R. P. M. A sample of the resulting cuprammonium cellulose solution was removed from the mixer on a glass stirring rod and placed between microscope slides. Upon examination of the sample by the naked eye, under a microscope, or when polarizing filters were held on either side of the microscope slides no cellulose fibers were observed. The total elapsed time from starting of violent agitation to fiber-free solution was about 5 minutes.

*Example 13*

Rayon tow was produced from a cuprammonium cellulose solution prepared as described in Example 1, above, according to the following procedure:

The cuprammonium cellulose solution was pumped from a storage tank at a rate of 184 grams per minute and extruded through a 1 inch spinnerette having 1500 openings of approximately 0.005 inch diameter into an aqueous caustic regenerating solution containing 70 grams of sodium hydroxide per liter. The spinnerette was placed near the bottom of a tank having approximately a four foot regenerating solution height, and the regenerated cellulose was drawn from the top of this regenerating solution by a 10¼ inch takeoff roll turning at 45 R. P. M. The regenerated cellulose tow traveled from the first takeoff roller to a second 10¼ inch diameter stretching roll turning at 60 R. P. M., and was then washed in water, in a dilute sulphuric acid solution, and finally rewashed in water and dried. Notwithstanding that the washing operation, in this particular instance, was carried out in a rather crude manner by passing the cellulose tow over rough wooden rollers, with the result that substantial numbers of individual cellulose filaments were broken in the course of this washing operation, the dried tow had a "tenacity," as the term is normally used in the rayon industry, of 2.43 grams per denier.

It will be apparent to those versed in the art that any other causticizing agent for cellulose such as any other alkali metal hydroxide can be substituted for NaOH used in the examples, that any copper compound capable of reaction with ammonia to produce a water soluble cuprammonium complex can be substituted for the CuSO₄·5H₂O shown in the examples, that any source for cellulose suitable for regeneration can be used in place of the relatively pure alpha-cellulose containing about 95 per cent thereof used in the examples, and that anhydrous NH₃ can be substituted for aqueous ammonia actually employed in the examples provided that there is present sufficient water to dissolve the anhydrous NH₃. Examples of other copper compounds that have been used for the production of cuprammonium cellulose solutions include CuCl₂, CuSO₄, Cu(OH)₂, and copper hydrate (CuSO₄·XCu(OH)₂). Best results have been achieved using sodium hydroxide as the causticizing agent, CuSO₄·5H₂O and aqueous ammonium hydroxide to form a water soluble copper ammonium complex, and water, when there has been present, per part of cellulose, from about 0.53 part to about 0.67 part of sodium hydroxide, from about 1.7 to about 2.1 parts of CuSO₄·5H₂O, from about 1.2 to about 2.0 parts of NH₃, and from about .12 to about 200 parts of water. For most purposes for which cuprammonium cellulose solutions are employed it is preferred that such solutions have a cellulose content somewhere in the vicinity of 5 per cent. Accordingly, for commercial operation, it is usually most preferred that there be present, per part of cellulose, about 0.6 part of sodium hydroxide, from about 1.9 to about 2.0 parts of CuSO₄·5H₂O, from about 1.3 to about 1.5 parts of NH₃, and from about 15 to about 19 parts of water. If an alkali metal hydroxide other than sodium hydroxide is used as the causticizing agent, the total number of mols thereof should be approximately the same as when sodium hydroxide is used. Similarly, if a copper compound other than CuSO₄·5H₂O is employed the total number of mols thereof should be approximately the same as when the hydrated copper sulfate is used.

Although the molecular weight of cellulose is unknown, it is known that the cellulose molecule is composed of a long chain of cellobiose molecules joined together, and that cellobiose is a beta disaccharide. Accordingly, the molecular formula for cellulose can be represented as follows: $(C_6H_{10}O_5)n$ where $n$ is an integer, and probably varies from cellulose molecule to cellulose molecule. However, when cellulose undergoes the reactions involved in producing a cellulose solution, the value of $n$ in the foregoing molecular formula for cellulose is immaterial, and can be assumed to be equal to 1 for purposes of calculating proportions of reactants. Accordingly, the molecular weight of cellulose is assumed, herein, and in the appended claims, to equal 162, the molecular weight when $n$ in the above formula equals 1. It will be apparent that where proportions of starting materials are recited in mols or molecular equivalents herein and in the appended claims, consistency in units, for example, gram mols or pound mols, is essential throughout a formulation.

The proportions of cellulose, sodium hydroxide, hydrated copper sulfate, water and ammonia hereinbefore given can readily be converted to molecular proportions when the molecular weight of cellulose is assumed to be 162, as stated in the preceding paragraph. Therefore, it is usually preferred that the materials employed in producing a cuprammonium cellulose solution according to the invention comprise, in the indicated proportions, 1 mol of cellulose, from about 2.1 to about 2.7 mols of a causticizing agent therefor, a soluble copper compound containing from about 1.1 to about 1.4 mols of copper, from about 108 to about 1800 mols of water and from about 11.4 to about 19 mols of ammonia to form a copper ammonium complex. It will be apparent that the use of an inorganic copper compound with water and ammonia to form a copper ammonium complex is preferred for economic reasons.

Similarly, stated in molecular proportions, it is usually most preferred in producing a cuprammonium cellulose solution according to the invention that the materials employed comprise, in the indicated proportions, 1 mol of cellulose, 2.4 mols of a causticizing agent therefor, a soluble copper compound containing from about 1.2 to about 1.3 mols of copper, from about 135 to about 171 mols of water and from about 12.4 to about 14.3 mols of ammonia to form a copper ammonium complex.

Analysis reveals that in the foregoing reported examples the lapse of time from the commencement of violent agitation of one or more of the ingredients in accordance with the invention to the termination of this agitation in accordance with the invention may be as little as 20 seconds when operating under optimum conditions and will be in the neighborhood of, say, 3–5 minutes under usual operating conditions. It has been found that where the ingredients are violently agitated in accordance with the invention, and even allowing for variations in the proportions of the ingredients, in the care with which the operation is performed, or in other factors subject to error, the cellulose will enter into solution within a maximum period of, say, from 15 to 20 minutes from the time of commencement of the agitation. Indeed, it may be generally stated that if the ingredients fail to enter solution within such a period it is because either the proportions are greatly different from those generally included within the above examples or the mixing performed upon the ingredients is without the degree of violent agitation according to the invention.

In general, therefore, violent agitation performed in accordance with the invention can be defined by the result (a substantially fiber-free cuprammonium cellulose solution) being achieved from starting materials (in the proportions encompassed within the preceding paragraphs) within a period of time not more than about 15 to 20 minutes from the time of commencement of the violent agitation of the starting materials.

Having described the invention, I claim:

1. A method for preparing a cellulose solution which comprises providing in a container having an agitator a mixture of cellulose, a causticizing agent therefor, a soluble copper compound, water and ammonia to form a copper ammonium complex, violently agitating the mixture by rotating the agitator at a speed of from about 1200 to about 3500 revolutions per minute to provide a zone of agitation, whereby all parts of the mixture are rapidly and repeatedly brought into and out of the zone of agitation and the ingredients are formed into a substantially fiber-free solution.

2. A method for preparing a cellulose solution which comprises providing in a container having an agitator a mixture of alpha cellulose moistened by an aqueous solution of a causticizing agent therefor, a soluble inorganic copper compound, water and ammonia to form a copper ammonium complex, violently agitating the mixture by rotating the agitator for a period of from about 2 minutes to about 20 minutes at a speed of from about 1200 to about 3500 revolutions per minute to provide a zone of agitation, whereby all parts of the mixture are rapidly and repeatedly brought into and out of the zone of agitation and the ingredients are formed into a substantially fiber-free solution.

3. A method for preparing a cellulose solution which comprises providing in a container having an agitating member a mixture in the proportions of one mol of cellulose, from about 2.1 to about 2.7 mols of a causticizing agent therefor, a soluble inorganic copper compound, from about 108 to 1800 mols of water and from about 11.4 to about 19 mols of ammonia to form a copper ammonium complex containing from about 1.1 to about 1.4 mols of copper, violently agitating the mixture by rotating the member at a speed of from about 1200 to about 3500 revolutions per minute to provide a zone of agitation whereby all parts of the mixture are rapidly and repeatedly brought into and out of the zone of agitation and the ingredients are formed into a substantially fiber-free solution.

4. A method for preparing a cellulose solution which comprises providing in a container having an agitating member carried by a substantially vertical shaft a mixture in the proportions of one mol of cellulose, from about 2.1 to about 2.7 mols of a causticizing agent therefor, a soluble inorganic copper compound, from about 108 to about 1800 mols of water and from about 11.4 to about 19 mols of ammonia to form a copper ammonium complex containing from about 1.1 to about 1.4 mols of copper, violently agitating the mixture by rotating the member for a period of from about two minutes to about twenty minutes at a speed of from about 1200 to about 3500 revolutions per minute to provide a zone of agitation whereby all parts of the mixture are rapidly and repeatedly brought into and out of the zone of agitation and the ingredients are formed into a substantially fiber-free solution.

5. A method for preparing a cellulose solution which comprises providing in a container having an agitator a mixture in the proportions of one mol of cellulose, from about 2.1 to about 2.7 mols of an alkali metal causticizing agent therefor, a soluble inorganic copper compound, from about 108 to about 1800 mols of water and from about 11.4 to about 19 mols of ammonia to form a copper ammonium complex containing from about 1.1 to about 1.4 mols of copper, violently agitating the mixture by rotating the agitator at a speed of about 1200 to about 3500 revolutions per minute to provide a zone of agitation whereby all parts of the mixture are rapidly and repeatedly brought into and out of the zone of agitation and the ingredients are formed into a substantially fiber-free solution.

6. A method for preparing a cellulose solution which comprises providing in a container having an agitating member carried on a shaft inclined to the horizontal a mixture in the proportions of one mol of cellulose, from about 2.1 to about 2.7 mols of an alkali metal causticizing agent therefor, a soluble inorganic copper salt, from about 108 to about 1800 mols of water and from about 11.4 to about 19 mols of ammonia to form a water-soluble copper ammonium complex containing from about 1.1 to about 1.4 mols of copper, violently agitating the mixture by rotating the member for a period of from about two to about twenty minutes at a speed of from about 1200 to about 3500 revolutions per minute to provide a zone of agitation whereby all parts of the mixture are rapidly and repeatedly brought into and out of the zone of agitation and the ingredients are formed into a substantially fiber-free solution.

7. A method for preparing a cellulose solution which comprises providing in a container having an agitating member a mixture in the proportions of one mol of cellulose, from about 2.1 to about 2.7 mols of an alkali metal causticizing agent therefor, from about 1.1 to about 1.4 mols of copper sulfate, from about 108 to about 1800 mols of water and from about 11.4 to about 19 mols of ammonia to form a water-soluble copper ammonium complex, violently agitating the mixture by rotating the member at a speed of from about 1200 to about 3500 revolutions per minute to provide a zone of agitation whereby all parts of the mixture are rapidly and repeatedly brought into and out of the zone of agitation and the ingredients are formed into a substantially fiber-free solution.

8. A method for preparing a cellulose solution which comprises providing in a container an agitating member carried by a shaft inclined to the horizontal a mixture in the proportions of one mol of cellulose, about 2.4 mols of an alkali metal causticizing agent therefor, from about 1.2 to about 1.3 mols of copper sulfate, from about 135 to about 171 mols of water and from about 12.4 to about 14.3 mols of ammonia to form a water-soluble copper ammonium complex, violently agitating the mixture by rotating the member at a speed of from about 1200 to about 3500 revolutions per minute to provide a zone of agitation whereby all parts of the mixture are rapidly and repeatedly brought into and out of the zone of agitation and the ingredients are formed into a substantially fiber-free solution.

9. A method for preparing a cellulose solution which comprises providing in a container having an agitating member carried by a shaft inclined to the horizontal a mixture in the proportions of one mol of alpha cellulose moistened with an aqueous solution containing about 2.4 mols of an alkali metal causticizing agent therefor, from about 1.2 to about 1.3 mols of copper sulfate, from about 135 to about 171 mols of water and from about 12.4 to about 14.3 mols of ammonia to form a water-soluble copper ammonium complex, violently agitating the mixture by rotating the member for a period of from about two minutes to about twenty minutes at a speed of from about 1200 to about 3500 revolutions per minute to provide a zone of agitation whereby all parts of the mixture are rapidly and repeatedly brought into and out of the zone of agitation and the ingredients are formed into a substantially fiber-free solution.

10. A method for preparing a cellulose solution which comprises providing in a container having an agitator carried by a substantially vertical shaft a mixture in the proportions of one mol of alpha cellulose moistened by an aqueous solution containing about 2.4 mols of sodium hydroxide, from about 1.2 to about 1.3 mols of copper sulfate, from about 135 to about 171 mols of water and from about 12.4 to about 14.3 mols of ammonia to form a water-soluble copper ammonium complex, violently agitating the mixture by rotating the agitator for a period of from about two minutes to about twenty minutes at a speed of from about 1200 to about 3500 revolutions per minute to provide a zone of agitation, whereby all parts of the mixture are rapidly and repeatedly brought into and out of the zone of agitation and the ingredients are formed into a substantially fiber-free solution.

EDWARD J. COURTNEY.

References Cited in the file of this patent

UNITED STATES PATENTS

| Number | Name | Date |
|---|---|---|
| 646,381 | Bronnert | Mar. 27, 1900 |
| 978,878 | Guadagni | Dec. 20, 1910 |
| 1,062,222 | Chaumat | May 20, 1913 |
| 1,457,977 | Kitsee | June 5, 1923 |
| 1,869,040 | Bassett | July 26, 1932 |
| 2,021,837 | Davidson | Nov. 19, 1940 |
| 2,225,431 | Furness | Dec. 17, 1940 |
| 2,247,124 | Furness | June 24, 1941 |